(12) United States Patent
Neumann et al.

(10) Patent No.: US 9,980,612 B2
(45) Date of Patent: May 29, 2018

(54) COOKING THERMOMETER SUSPENSION DEVICE AND METHOD

(71) Applicants: Kimberly Neumann, Bovey, MN (US); Lynn Wilson, Grand Rapids, MN (US)

(72) Inventors: Kimberly Neumann, Bovey, MN (US); Lynn Wilson, Grand Rapids, MN (US)

( * ) Notice: Subject to any disclaimer, the term of this patent is extended or adjusted under 35 U.S.C. 154(b) by 0 days. days.

(21) Appl. No.: 15/352,530

(22) Filed: Nov. 15, 2016

(65) Prior Publication Data

US 2017/0156547 A1     Jun. 8, 2017

Related U.S. Application Data

(60) Provisional application No. 62/263,622, filed on Dec. 5, 2015.

(51) Int. Cl.
| | |
|---|---|
| *A47B 96/06* | (2006.01) |
| *A47J 45/02* | (2006.01) |
| *F16M 13/02* | (2006.01) |
| *F16B 2/10* | (2006.01) |

(52) U.S. Cl.
CPC .................. *A47J 45/02* (2013.01); *F16B 2/10* (2013.01); *F16M 13/022* (2013.01)

(58) Field of Classification Search
USPC ...................................................... 248/213.2
See application file for complete search history.

(56) References Cited

U.S. PATENT DOCUMENTS

| | | | | |
|---|---|---|---|---|
| 1,117,277 | A * | 11/1914 | Supplee | H05B 3/78 |
| | | | | 24/339 |
| 2,597,275 | A * | 5/1952 | Ahlstrand | A47G 21/145 |
| | | | | 131/257 |
| 2,906,124 | A | 4/1954 | Chaney | |
| 3,596,964 | A * | 8/1971 | Zazzara | B43L 15/00 |
| | | | | 224/217 |
| 3,636,769 | A * | 1/1972 | Chaney | G01K 5/025 |
| | | | | 374/190 |
| 3,931,668 | A * | 1/1976 | Hombach | A47J 43/287 |
| | | | | 24/332 |
| 4,121,798 | A * | 10/1978 | Schumacher | A47L 13/512 |
| | | | | 24/336 |
| 4,193,572 | A * | 3/1980 | Horiuchi | F16M 13/00 |
| | | | | 248/229.26 |
| D305,026 | S * | 12/1989 | Wolf | D14/229 |
| 6,477,744 | B1 * | 11/2002 | Miles | B43K 23/002 |
| | | | | 24/3.1 |
| 6,501,384 | B2 | 12/2002 | Chapman et al. | |
| 6,580,662 | B2 * | 6/2003 | Vassallo | A47J 36/32 |
| | | | | 368/10 |
| 7,254,915 | B2 * | 8/2007 | Mrotek | A01K 97/10 |
| | | | | 248/227.1 |

(Continued)

*Primary Examiner* — Monica Millner
(74) *Attorney, Agent, or Firm* — Integrity Patent Group, PLC; Edwin Wold

(57) ABSTRACT

A device for suspending a cooking thermometer includes a cooking vessel interface having a cooking vessel attachment, a thermometer receiver, and an extension member. The device for suspending a cooking thermometer is useful for placing a cooking thermometer within a cooking vessel at a distance away from the outer walls of the cooking vessel such that the thermal effects of the heat from the outer walls of the cooking vessel are reduced to provide a more accurate temperature reading for the contents of the cooking vessel.

19 Claims, 5 Drawing Sheets

(56) References Cited

U.S. PATENT DOCUMENTS

| | | | |
|---|---|---|---|
| 8,282,277 B2 | 10/2012 | Guo et al. | |
| 9,427,674 B2 * | 8/2016 | Oi | A63H 33/00 |
| 2006/0274814 A1 * | 12/2006 | Wang | G01K 1/14 |
| | | | 374/208 |
| 2008/0107146 A1 | 5/2008 | Hadj-Chikh | |
| 2010/0237208 A1 * | 9/2010 | Di Lollo | A47J 47/16 |
| | | | 248/213.2 |
| 2012/0012723 A1 * | 1/2012 | Mansfield | A24F 1/30 |
| | | | 248/230.8 |
| 2012/0152969 A1 * | 6/2012 | Ates | A47G 21/16 |
| | | | 220/735 |

\* cited by examiner

COOKING THERMOMETER SUSPENSION DEVICE AND METHOD

CROSS-REFERENCE TO RELATED APPLICATION

The present application is related to and claims priority to U.S. Provisional Patent Application No. 62/263,622 filed Dec. 5, 2015, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of thermal measuring and testing and more specifically relates to a thermometer accessory.

2. Description of Related Art

People use a candy or sugar thermometer to ensure that cooking solutions are heated precisely. Even a difference of a few degrees can mean the difference between a proper consistency and a failed recipe. Exact temperature readouts are therefore extremely important. Some people may choose to physically hold the thermometer in the boiling solution or oil to ensure that the thermometer does not touch the side or bottom of the pot, but this is extremely dangerous and can lead to serious injury or burns. A suitable solution is desired.

U.S. Pat. No. 2,906,124 to Chaney relates to a cooking thermometer support. The described cooking thermometer support includes a clip for a cooking thermometer which will support the thermometer in use with its bulb immersed in the cooking liquid in the pan and located inwardly in spaced relation with respect to the side wall of the pan and above the bottom thereof to be responsive to the internal temperature of the cooking liquid, substantially independently of the temperature of the pan. Another object of the invention is to provide such a clip of simple and economical construction which may readily be fitted on a cooking thermometer and easily adjusted so that the thermometer may be left in the pan during cooking, supported therein at a desired angle for viewing, and which is adapted for use with cooking pans of different sizes and having different kinds of rims or heads at the upper edges thereof.

BRIEF SUMMARY OF THE INVENTION

In view of the foregoing disadvantages inherent in the known thermal measuring and testing art, the present disclosure provides a device and method for suspending a cooking thermometer. The general purpose of the present disclosure, which will be described subsequently in greater detail, is to provide a device and method for suspending a cooking thermometer.

A device for suspending a cooking thermometer, the cooking thermometer having a temperature sensing element is disclosed herein. The device for suspending a cooking thermometer includes a cooking vessel attachment configured to attach to an outer wall of a cooking vessel. The cooking vessel attachment includes a cooking vessel interface having a spring-energized clamp with the cooking vessel interface configured to clamp on to the outer wall of the cooking vessel, and a user interface including a pair of compression handles. Each compression handle has a finger receiver. The user interface is configured to disengage the cooking vessel interface from the outer wall of the cooking vessel. The cooking vessel attachment includes a thermometer receiver configured to receive and hold the cooking thermometer, and an extension member mechanically interspersed between and coupled to the cooking vessel attachment and the thermometer receiver. The extension member is configured to offset the thermometer receiver from the cooking vessel attachment such that the temperature sensing element is positioned at least 0.5 inch from the outer wall of the cooking vessel.

A method of using a device for suspending a cooking thermometer is also disclosed herein. The method of using a device for suspending a cooking thermometer may include the steps of: coupling a cooking thermometer with the thermometer receiver, gripping the pair of compression handles of the user interface, squeezably-opening the spring-energized clamp of a cooking vessel attachment, attaching the cooking vessel attachment to an outer wall of a cooking vessel, releasing the pair of compression handles, gripping the pair of compression handles of the user interface, squeezably-opening the spring-energized clamp of the cooking vessel attachment, removing the cooking vessel attachment from the outer wall of a cooking vessel, releasing the pair of compression handles, and uncoupling the cooking thermometer from the thermometer receiver.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a device for suspending a cooking thermometer, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a thermometer accessory and more particularly to a device for suspending a cooking thermometer.

Generally, clips may be used to fasten items to another object. The present invention contains a clip that attaches to the side of a pot and a holder for a candy thermometer and keeps the thermometer from touching the bottom and sides of a pot. The device effectively ensures that temperature is measured accurately and thus prevents food from being scalded or under-cooked due to inaccurate temperature measurements. The present invention virtually eliminates the chance a person will burn themselves when holding a thermometer over a boiling pot.

The device for suspending a cooking thermometer is a thermometer holder that attaches to the side of cooking utensil, such as a pot. This innovative product can be made of a stainless steel (or similar material) clamp with silicone or similar grips. The clamp may have teeth on both sides to ensure a secure grip on the side of a pot. The clamp may be connected to a holder via a half inch offset rod. The thermometer holder may have a roughly half-inch opening in which the thermometer would be placed. The product may extend outwardly approximately one half inch from the edge of the pot to ensure accurate temperature readout. The product may function with a wide variety of candy thermometers and can attach to virtually any size pot.

Figure 1A:
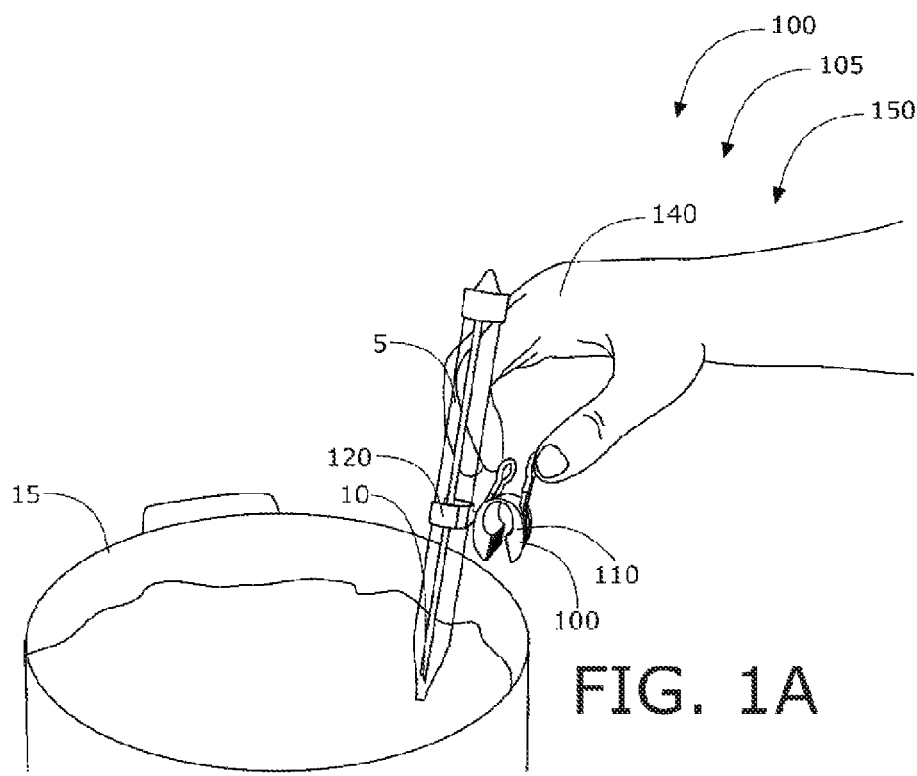
FIG. 1A is a perspective view of the device for suspending a cooking thermometer during an 'in-use' condition, according to an embodiment of the disclosure.
Figure 1B:
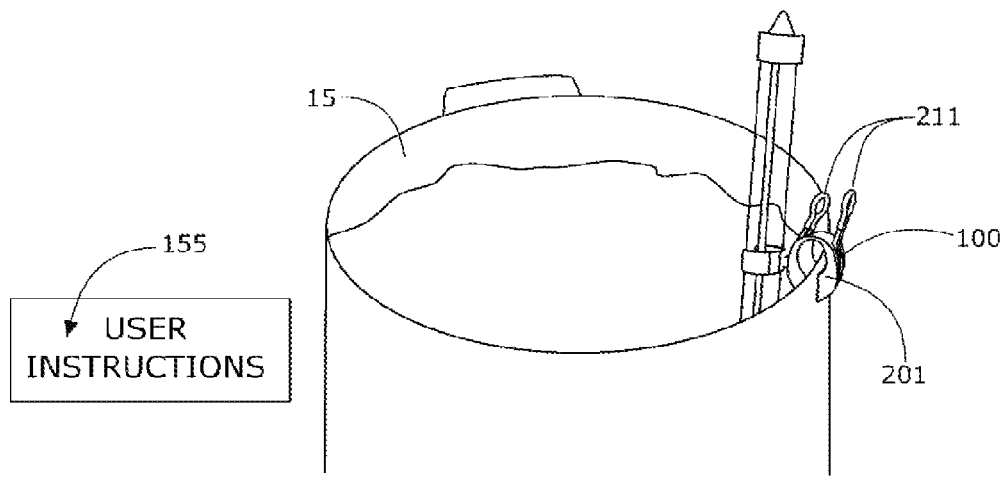
FIG. 1B is a perspective view of the device for suspending a cooking thermometer of FIG. 1 during an 'in-use' condition and installed onto a cooking vessel.
Figure 2:
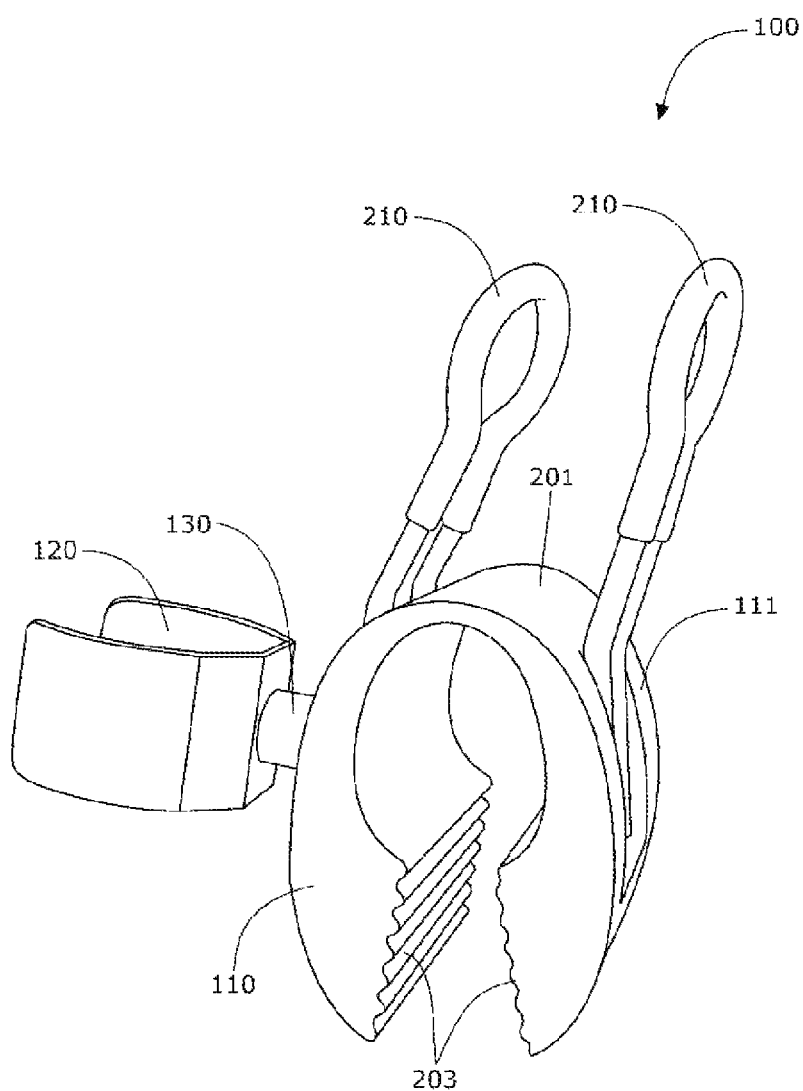
FIG. 2 is a perspective view of the device for suspending a cooking thermometer of FIG. 1A, according to an embodiment of the present disclosure.
Figure 3:
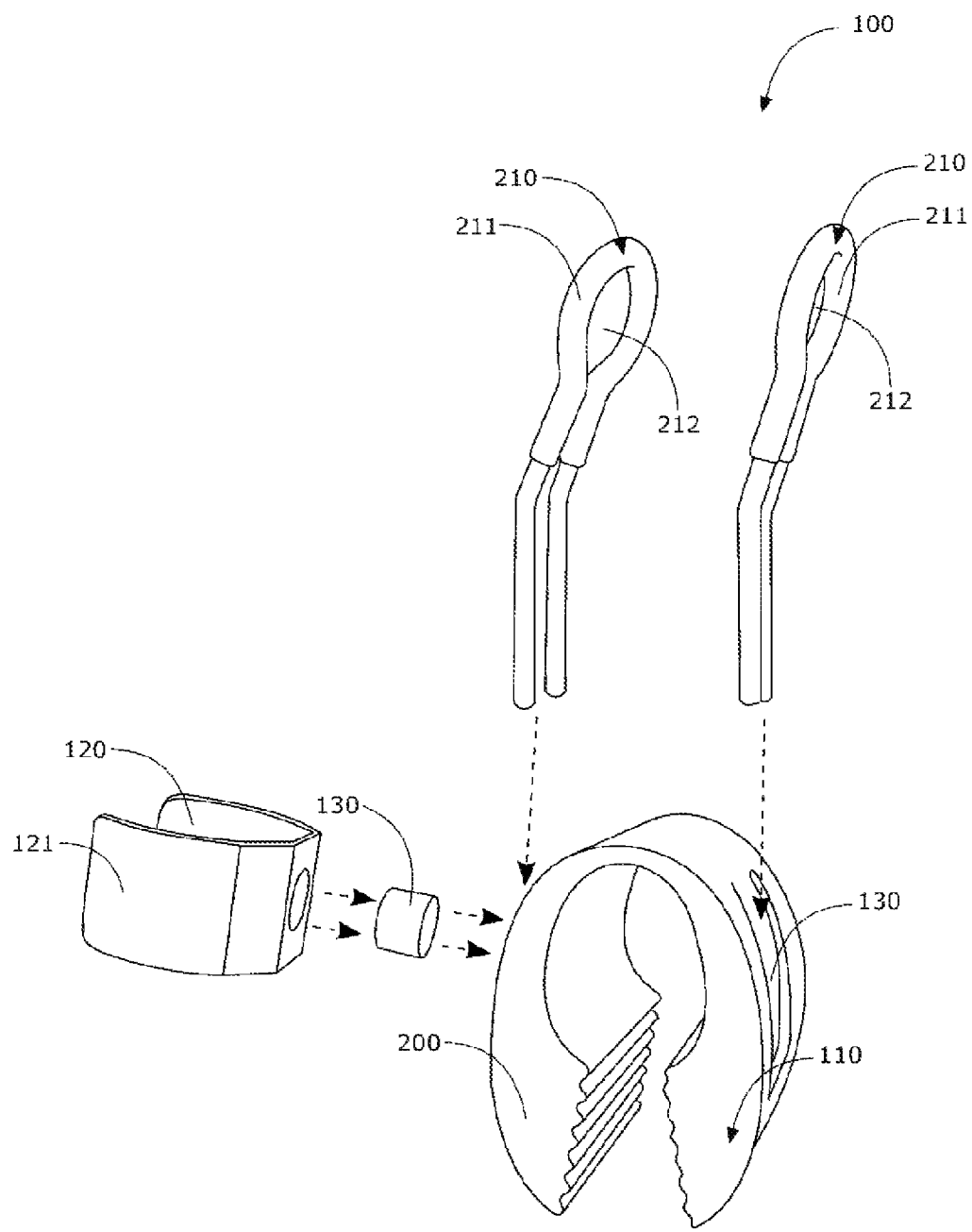
FIG. 3 is an exploded view of the device for suspending a cooking thermometer of FIG. 1A, according to an embodiment of the present disclosure.

Referring now more specifically to the drawings by numerals of reference, there is shown in FIGS. 1A-4, various views of a device for suspending a cooking thermometer 100. FIG. 1A shows the device for suspending a cooking thermometer 100 during an 'in-use' condition 150, according to an embodiment of the present disclosure. Here, the device for suspending a cooking thermometer may be beneficial for use by a user 140 to place a cooking thermometer 5 within a cooking vessel 15 at a distance away from the outer walls of the cooking vessel 15 such that the thermal effects of the heat from the outer walls of the cooking vessel 15 are reduced to provide a more accurate temperature reading for the contents of the cooking vessel. As illustrated, the device for suspending a cooking thermometer 100 may include a cooking vessel attachment 110, a thermometer receiver 120, and an extension member 130 (FIG. 3).

As discussed above, the device for suspending a cooking thermometer 100, may be configured to receive the cooking thermometer 5, having a temperature sensing element 10. The device for suspending a cooking thermometer 100 may comprise a cooking vessel attachment 110 configured to attach to an outer wall of a cooking vessel 15, and an extension member 130, which may be configured to offset the thermometer receiver 120 from the cooking vessel attachment 110. The extension member 130 may be configured so that the cooking thermometer 5 temperature sensing element 10 is positioned at least 0.5 inch from the outer wall of the cooking vessel 15. In alternative embodiments of the present disclosure, the extension member 130 may be configured to have a length ranging from 0.25 inches to up to 3.0 inches to achieve a desired thermometer offset, and to accommodate cookware of varying thicknesses as may be found with cast iron, ceramic, stainless steel, and the like, which may have differing wall effects.

FIG. 1B shows the device for suspending a cooking thermometer 100, which may have a spring-energized clamp 201. The spring-energized clamp 201 may be configured to be substantially symmetrical about opposing clamped sides of the outer wall of the cooking vessel 15. In addition, the spring-energized clamp 201 may be configured to be squeezable together with a pair of with a pair of compression handles 211. When the pair of compression handles 211 are squeezed together, the spring-energized clamp 201 may be able to be unclamped or otherwise released from the outer wall of the cooking vessel 15. Furthermore, when the pair of compression handles 211 are released, the spring-energized clamp 201 may be able to clamp on the wall of the cooking vessel 15.

According to another embodiment of the present disclosure, the cooking vessel attachment 100 may be further configured to attach to a lifting handle of the cooking vessel 15. Examples of cooking vessel lifting handles may include the singular long handle as may be found on typical sauce pans. Alternatively, larger sauce pots or soup pots having the same sauce pan shape generally have two handles on opposing sides of the pot to enable lifting with two hands. The cooking vessel attachment 100 may be configured to attach to a singular long handle or to one of the two handles on opposing sides of a larger sauce or soup pot. In these cases, the extension member 130 may be further configured to also extend from the handle to the inside of the pot.

According to one embodiment, the device for suspending a cooking thermometer 100 may be arranged as a kit 105. In particular, the device for suspending a cooking thermometer 100 may further include a set of instructions 155. The instructions 155 may detail functional relationships in relation to the structure of the device for suspending a cooking thermometer 100 (such that the device for suspending a cooking thermometer 100 can be used, maintained, or the like, in a preferred manner).

FIG. 2 shows the device for suspending a cooking thermometer 100 of FIG. 1 in isolation, according to an embodiment of the present disclosure. As above, the device for suspending a cooking thermometer 100 may include the cooking vessel attachment 110 and a thermometer receiver 120. In addition, the cooking vessel attachment 110 may include a user interface 210. The user interface 210 may be configured to attach and release the cooking vessel attachment 110 to and from the cooling vessel 15 (FIG. 1A).

According to one embodiment, the cooking vessel interface 110 may include a spring-energized clamp 201, with the cooking vessel interface 110 configured to clamp on to the outer wall of the cooking vessel 15. The cooking vessel interface 110 may further include a plurality of opposing protrusions 203 or teeth, such that the opposing sides of the outer wall of the cooking vessel 15 may be contacted when the cooking vessel interface 110 is clamped on to the outer wall of the cooking vessel 15. The opposing protrusions 203 may be able to provide additional friction, or grip, to assist in maintaining the position of the cooking vessel interface 110 when clamped to the outer wall of the cooking vessel 15.

According to one embodiment, the cooking vessel attachment 110 may be made of a heat-resistant material 111. The heat-resistant material which may be used may include stainless steel. In alternate embodiments, the cooking vessel interface 110 may be constructed of other materials which may include ceramic or temperature-resistant plastic.

The thermometer receiver 120 may be configured to receive the cooking thermometer 5 (FIG. 1A) while the cooking vessel attachment 110 is attached to an outer wall of a cooking vessel 15. As shown, the thermometer receiver 120 may also be configured to provide for vertical adjustment of the cooking thermometer 5 in relation to a bottom surface of the cooking vessel 15. In particular, the thermometer receiver 120 may provide sufficient grip to hold the cooking thermometer 5, but enough flexibility to allow the user to slide the cooking thermometer 5 within the thermometer receiver 120. Adjusting the vertical displacement of the cooking thermometer 5 may be beneficial to reducing the thermal effects of the heat from the bottom surface of the cooking vessel 15 during an 'in-use' condition 150 (FIG. 1A).

FIG. 3 is an exploded view of the device for suspending a cooking thermometer 100 of FIG. 1A, according to an embodiment of the present disclosure. As above, the device for suspending a cooking thermometer 100 may include the cooking vessel attachment 110, the thermometer receiver 120, and the extension member 130. In structural and functional combination, the extension member 130 may be interspersed between, and mechanically coupled to, the cooking vessel attachment 110 and the thermometer receiver 120. In this manner, the extension member 130 may be configured to offset the thermometer receiver 120 from the cooking vessel attachment 110, such that the temperature sensing element 10 (FIG. 1A) may be positioned or otherwise offset at least 0.5 inch from the outer wall of the cooking vessel 15 (FIG. 1A).

According to one embodiment of the present disclosure, the extension member 130 may further be configured to suspend the cooking thermometer 5 (FIG. 1A) such that the temperature sensing element 10 may be approximately equidistant from all sides of the outer wall of the cooking vessel 15. Equidistant placement of the cooking thermometer 5 may be desirable when the contents of the cooking vessel 15 require thermal monitoring but may not require stirring.

The thermometer receiver 120 may include a spring-energized clamp 121, which may be configured to receive and frictionally-hold the cooking thermometer 5. In additional embodiments of the present disclosure, the spring-energized clamp 121 may be configured to frictionally hold a plurality of types of thermometers. The plurality of types of thermometers may include jam, oil, brewing, or candy types of thermometers.

According to one embodiment, the user interface 210 may include a pair of compression handles 211. The pair of compression handles 211 may be mechanically coupled to the cooking vessel attachment 110. In addition, each compression handle 211 may include a finger receiver 212. The finger receiver 212 may be used to aid in gripping the user interface 210, as the user interface 210 may be configured to disengage the cooking vessel interface 110 from the outer wall of the cooking vessel 15. In another embodiment, the pair of compression handles 211 may be configured to angle outward from the center of the cooking vessel attachment 110 aid with engaging the user interface 210.

Figure 4:
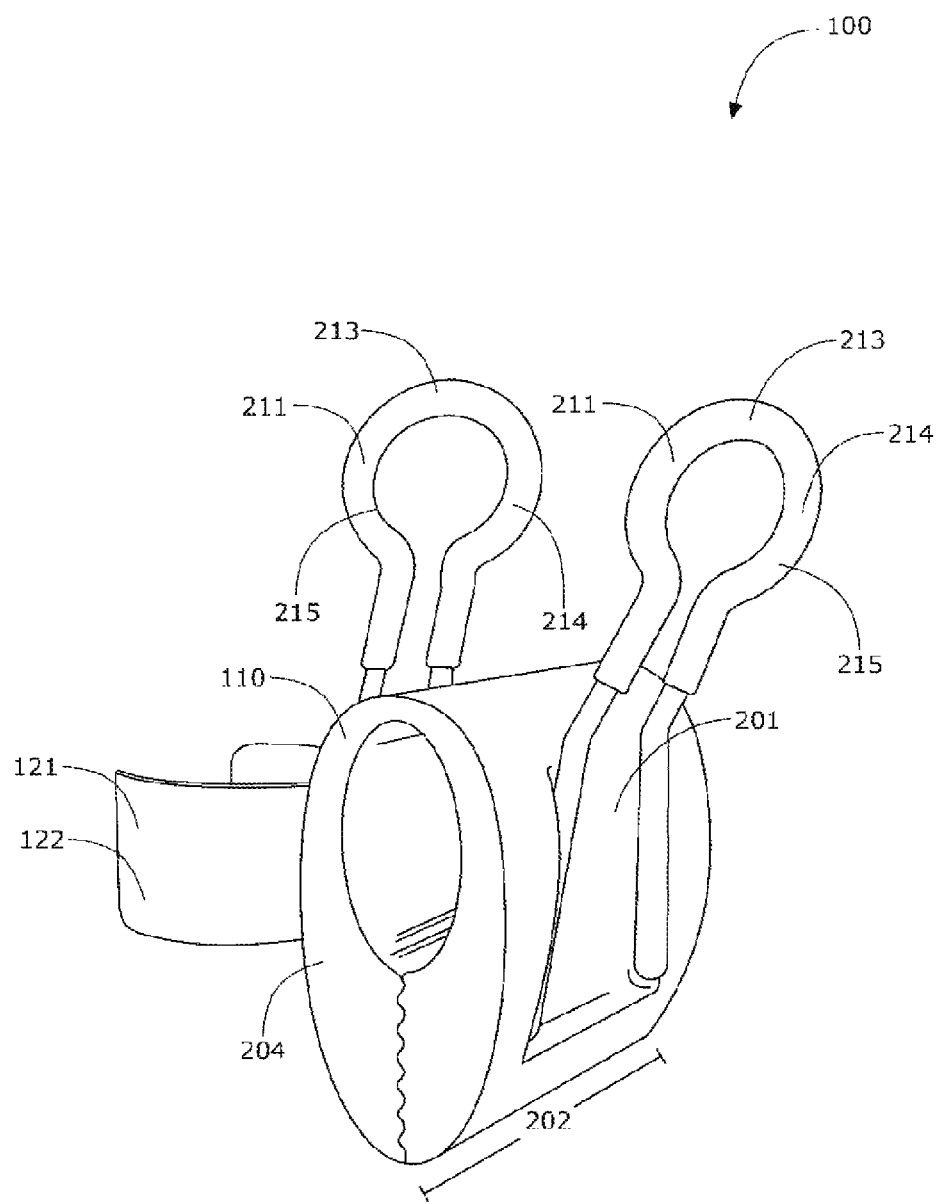
FIG. 4 is a perspective view of the device for suspending a cooking thermometer of FIG. 1A, according to an embodiment of the present disclosure.

FIG. 4 is a perspective view of the device for suspending a cooking thermometer 100 of FIG. 1A, according to an embodiment of the present disclosure. When clamped to the cooking vessel 15 (FIG. 1A), the cooking vessel interface 110 may have a rounded outer cross-section 204 perpendicular to the outer wall of the cooking vessel 15 (FIG. 1A). Similarly, in alternative embodiments, the cooking vessel interface 110 may include substantially rectangular cross sections. In referring now to the spring-energized clamp 201 of the cooking vessel interface 110, the spring-energized clamp 201 may have a grip length 202, here measured horizontally and perpendicular to a vertical orientation of the cooking thermometer 5 (when installed). The length of the 202 spring-energized clamp 201 may have an approximate range of 0.5 inches to 1.5 inches.

As above, the thermometer receiver 120 may include the spring-action clamp 121. The spring-action clamp 121 may be configured as a unitary piece of shaped metal 122. In this configuration, the spring-action clamp 121 may able to engage a plurality of cooking thermometer types, as discussed above.

The pair of compression handles 211 may include a silicone coating 213 configured to provide heat resistance. Further, the silicone coating 213 may be configured to provide a gripable surface 214 during hot and humid conditions, as may be experienced while simmering or boiling liquids are brought to a required temperature. The pair of compression handles 211 may each have a substantially rounded shape to conform with the finger pads of the user 140 (FIG. 1A) in a manner which may provide increased grip. In alternate embodiments of the present disclosure, alternate shapes for the pair of compression handles 211 may be used to provide a substantial gripping surface. Also, in an alternate embodiment of the present disclosure, other types of heat resistant materials for the pair of compression handles 211, such as ceramic, may be included.

Figure 5:
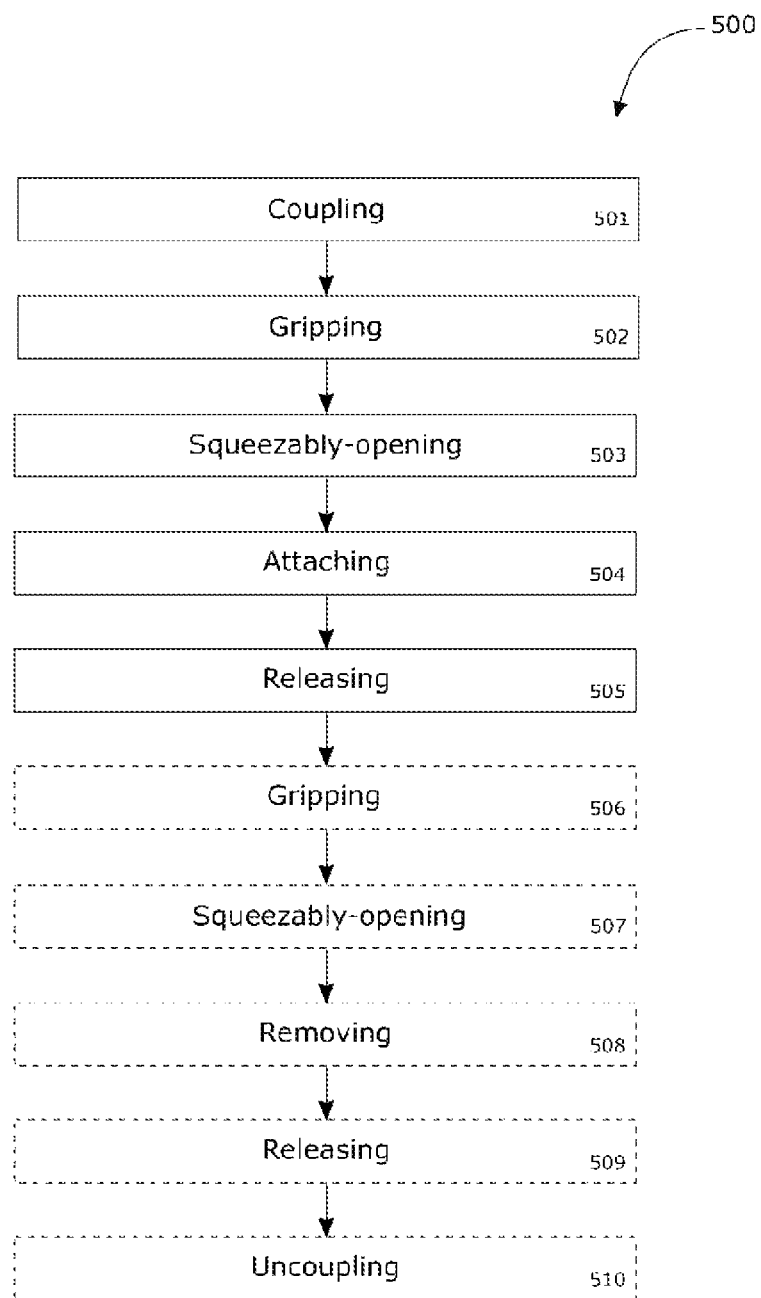
FIG. 5 is a flow diagram illustrating a method of use for device for suspending a cooking thermometer, according to an embodiment of the present disclosure.

FIG. 5 is a flow diagram illustrating a method of use 500 for a device for suspending a cooking thermometer, according to an embodiment of the present disclosure. In particular, the method for use 500 for a device for suspending a cooking thermometer may include one or more components or features of the device for suspending a cooking thermometer 100 as described above. As illustrated, the method for use 500 of the device for suspending the cooking thermometer may include the steps of: step one 501, coupling a cooking thermometer with the thermometer receiver; step two 502, gripping the pair of compression handles of the user interface; step three 503, squeezably-opening a spring-energized clamp of a cooking vessel attachment; step four 504, attaching the cooking vessel attachment to an outer wall of a cooking vessel; step five 505, releasing the pair of compression handles; step six 506, gripping the pair of compression handles of the user interface; step seven 507, squeezably-opening the spring-energized clamp of the cooking vessel attachment; step eight 508, removing the cooking vessel attachment from the outer wall of a cooking vessel; step nine 509, releasing the pair of compression handles; and step ten 510, uncoupling the cooking thermometer from the thermometer receiver.

It should be noted that steps 506, 507, 508, 509, and 510 are optional steps and might not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. §112(f). It should also be noted that, under appropriate circumstances, considering such issues as design preference, user preferences, marketing preferences, cost, structural requirements, available materials, technological advances, etc., other methods for the device for suspending a cooking thermometer (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A device for suspending a cooking thermometer, the cooking thermometer having a temperature sensing element, the device comprising:
   a) a cooking vessel attachment configured to attach to an outer wall of a cooking vessel, the cooking vessel attachment including:
      i) an extension member interface configured to mechanically interface with an extension member;
      ii) a cooking vessel interface including a spring-energized clamp, the cooking vessel interface configured to clamp on to the outer wall of the cooking vessel, and
      iii) a user interface including a pair of symmetrical compression handles, each compression handle having a finger receiver, said user interface configured to disengage the cooking vessel interface from the outer wall of the cooking vessel and said finger receiver structured and arranged with a gripper further structured and arranged for a user to grip said user interface;
   b) a thermometer receiver configured to receive and vertically-slidingly-hold the cooking thermometer above a bottom of the cooking vessel; and
   c) an extension member interspersed between and mechanically coupled to the cooking vessel attachment and the thermometer receiver, the extension member structured and arranged with said extension member interface and further structured and arranged with said thermometer receiver to physically offset the thermometer receiver from the cooking vessel attachment such that the temperature sensing element is positioned at least 0.5 inch from the outer wall of the cooking vessel.

2. The device of claim 1, wherein the cooking vessel attachment is made of heat-resistant material.

3. The device of claim 2, wherein the heat-resistant material includes stainless steel.

4. The device of claim 1, wherein the spring-energized clamp is substantially symmetrical about opposing clamped sides of the outer wall of the cooking vessel, and is configured unclamp from the outer wall of the cooking vessel when the pair of compression handles are squeezed together and to clamp on the outer wall of the cooking vessel when the pair of compression handles are released.

5. The device of claim 4, wherein the cooking vessel interface further includes a plurality of opposing protrusions such that opposing sides of the outer wall of the cooking vessel are contacted when the cooking vessel interface is clamped on to the outer wall of the cooking vessel.

6. The device of claim 1, wherein the cooking vessel interface has a rounded outer cross-section perpendicular to the outer wall of the cooking vessel when clamped on.

7. The device of claim 4, wherein the spring-energized clamp further has a grip length, said grip length having an approximate range of 0.5 inches to 1.5 inches.

8. The device of claim 1, wherein the pair of compression handles includes a silicone coating configured to provide heat resistance.

9. The device of claim 8, wherein the silicone coating is further configured to provide a gripable surface during hot and humid conditions.

10. The device of claim 1, wherein each of the pair of compression handles has a substantially rounded shape conforming with finger pads of the user, and configured to provide increased finger grip.

11. The device of claim 1, wherein the thermometer receiver is configured to provide for vertical adjustment of the cooking thermometer in relation to a bottom surface of the cooking vessel.

12. The device of claim 1, wherein the thermometer receiver includes a spring-action clamp configured to frictionally-hold the cooking thermometer.

13. The device of claim 12, wherein the spring-action clamp includes a unitary piece of shaped metal.

14. The device of claim 12, wherein the spring-action clamp is able to hold a plurality of cooking thermometer types.

15. The device of claim 1, wherein the extension member is further configured to suspend the cooking thermometer such that the temperature sensing element is approximately equidistant from all sides of the outer wall of the cooking vessel.

16. The device of claim 1, wherein the cooking vessel attachment is further configured to attach to a lifting handle of the cooking vessel.

17. A device for suspending a cooking thermometer, the cooking thermometer having a temperature sensing element, the device comprising:
   a) a cooking vessel attachment configured to attach to an outer wall of a cooking vessel, the cooking vessel attachment including:
      i) an extension member interface configured to mechanically interface with an extension member;
      ii) a cooking vessel interface including a spring-energized clamp, the cooking vessel interface configured to clamp on to the outer wall of the cooking vessel, and
      iii) a user interface including a pair of symmetrical compression handles, each compression handle having a finger receiver, said user interface configured to disengage the cooking vessel interface from the outer wall of the cooking vessel and said finger receiver structured and arranged with a gripper further structured and arranged for a user to grip said user interface;
   b) a thermometer receiver configured to receive and vertically-slidingly-hold the cooking thermometer above a bottom of the cooking vessel; and
   c) an extension member interspersed between and mechanically coupled to the cooking vessel attachment and the thermometer receiver, the extension member structured and arranged with said extension member interface and further structured and arranged with said thermometer receiver to physically offset the thermometer receiver from the cooking vessel attachment such that the temperature sensing element is positioned at least 0.5 inch from the outer wall of the cooking vessel;

d) wherein the cooking vessel attachment is made of heat-resistant material;

e) wherein the heat-resistant material includes stainless steel;

f) wherein the spring-energized clamp is substantially symmetrical about opposing clamped sides of the outer wall of the cooking vessel, and is configured to unclamp from the outer wall of the cooking vessel when the pair of compression handles are squeezed together and to clamp on the outer wall of the cooking vessel when the pair of compression handles are released;

g) wherein the cooking vessel interface further includes a plurality of opposing protrusions such that opposing sides of the outer wall of the cooking vessel are contacted when the cooking vessel interface is clamped on to the outer wall of the cooking vessel;

h) wherein the cooking vessel interface has a rounded outer cross-section perpendicular to the outer wall of the cooking vessel when clamped on;

i) wherein the spring-energized clamp further has a grip length, said grip length having an approximate range of 0.5 inches to 1.5 inches;

j) wherein the pair of compression handles includes a silicone coating configured to provide heat resistance;

k) wherein the silicone coating is further configured to provide a gripable surface during hot and humid conditions;

l) wherein the pair of compression handles has a substantially rounded shape conforming with finger pads of a user, and configured to provide increased finger grip;

m) wherein the thermometer receiver is configured to provide for vertical adjustment of the cooking thermometer in relation to a bottom surface of the cooking vessel;

n) wherein the thermometer receiver includes a spring-action clamp configured to frictionally-hold the cooking thermometer;

o) wherein the spring-action clamp includes a unitary piece of shaped metal; and p) wherein the spring-action clamp is able to hold a plurality of cooking thermometer types.

18. A method of using the device for suspending a cooking thermometer of claim 17 for suspending a cooking thermometer, the method comprising the steps of:

a) coupling a cooking thermometer with a thermometer receiver;

b) gripping a pair of compression handles of a user interface;

c) squeezably-opening a spring-energized clamp of a cooking vessel attachment;

d) attaching the cooking vessel attachment to an outer wall of a cooking vessel; and e) releasing the pair of compression handles.

19. The method of claim 18, further comprising the steps of:

a) gripping the pair of compression handles of the user interface;

b) squeezably-opening the spring-energized clamp of the cooking vessel attachment;

c) removing the cooking vessel attachment from the outer wall of the cooking vessel;

d) releasing the pair of compression handles, and e) uncoupling the cooking thermometer from the thermometer receiver.

\* \* \* \* \*